(12) United States Patent
Naik et al.

(10) Patent No.: US 7,203,427 B2
(45) Date of Patent: Apr. 10, 2007

(54) REDUNDANT PATH ALL-OPTICAL REGENERATION, RESHAPING AND WAVELENGTH CONVERSION FOR ENHANCED YIELD

(75) Inventors: Gaurav Naik, Eatontown, NJ (US); Jithamithra Sarathy, Atlantic Highlands, NJ (US); Michael Evans, Ocean Township, NJ (US); David Lidsky, Sea Bright, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 650 days.

(21) Appl. No.: 10/147,333

(22) Filed: May 15, 2002

(65) Prior Publication Data

US 2003/0002117 A1    Jan. 2, 2003

Related U.S. Application Data

(60) Provisional application No. 60/364,927, filed on Mar. 15, 2002, provisional application No. 60/291,288, filed on May 15, 2001, provisional application No. 60/291,287, filed on May 15, 2001.

(51) Int. Cl.
*H04B 10/02* (2006.01)
(52) U.S. Cl. ................ 398/175; 398/176; 398/180
(58) Field of Classification Search ............ 398/37, 398/155, 175, 176, 180
See application file for complete search history.

(56) References Cited

U.S. PATENT DOCUMENTS

| | | | | |
|---|---|---|---|---|
| 6,563,621 B2* | 5/2003 | Dave et al. | ............... | 398/176 |
| 6,563,627 B2* | 5/2003 | Yoo | ..................... | 359/326 |
| 6,775,481 B2* | 8/2004 | Janz et al. | ................ | 398/175 |
| 2002/0003652 A1* | 1/2002 | Leuthold | .................. | 359/332 |
| 2002/0080453 A1* | 6/2002 | Leuthold et al. | .......... | 359/176 |
| 2002/0159684 A1* | 10/2002 | Sun et al. | .................. | 385/20 |

* cited by examiner

*Primary Examiner*—Dzung Tran
(74) *Attorney, Agent, or Firm*—Kaplan Gilman Gibson & Dernier LLP (57) ABSTRACT

A system, method and device for AO2R is presented. The AO2R system presented is redundant, containing multiple pathways for the input and output signals to travel. The system carries out both the regeneration and reshaping functions in the optical domain, and returns a clean output signal at the same bit rate and in the same format as the input signal, on a wavelength of choice. As an all optical device, the apparatus is bit rate and format transparent, and requires no optical-electrical-optical conversion. The system's built in redundancy and symmetry allows less than perfect yields on components to be tolerated, thus increasing the utility of devices manufactured with less than perfect yields. In alternative embodiments the redundancy aspect of the invention can be extended to any optical signal processing device, thus facilitating high availability optical signal processing.

12 Claims, 9 Drawing Sheets

REDUNDANT PATH ALL-OPTICAL REGENERATION, RESHAPING AND WAVELENGTH CONVERSION FOR ENHANCED YIELD

CROSS REFERENCE TO OTHER APPLICATIONS

This application claims the benefit of U.S. Provisional Patent Application Nos. 60/364,927, filed on Mar. 15, 2002, and 60/291,288 and 60/291,287, each filed on May 15, 2001.

TECHNICAL FIELD

This invention relates to telecommunications, and more specifically, to a system and method for the all optical reshaping and regeneration, as well as wavelength conversion, of optical signals in a data network.

BACKGROUND OF THE INVENTION

Noise, and attenuation in long-haul optical line systems result in the deterioration of the transmitted signal, both as to its amplitude as well as its shape. Consequently, one of the fundamental requirements of nodal equipment in optical networks is the capability to regenerate and reshape the optical pulses. These functions are known as 2R, for regeneration and reshaping. Notwithstanding the plethora of claims by various companies to have implemented "all-optical" systems, presently retiming of the optical pulses is achieved by converting the incoming optical signal into an electrical signal. This is followed by full regeneration and reshaping of the electrical signal using Application Specific Integrated Circuits (ASICs). A laser source is then modulated using this fully regenerated and reshaped electrical signal. Such systems are termed OEO, or Optical-Electrical-Optical. However, there are certain drawbacks to converting an optical signal into an electrical one and back again. First, electrical processing of data signals is not transparent to bit rate and is format sensitive. Thus, an OEO system could not process an arbitrary incoming data signal; the bit rate, format and coding would need to be known a priori. Different bit rates require different ASICs to process them in the electrical domain. Second, there is a significant power loss in converting to the electrical domain, and a similar power loss in converting back again therefrom to the optical domain.

As optical networks become increasingly transparent, there is thus a need to regenerate the signal without resorting to OEO conversion of the signal. Such regeneration, if truly done all optically, is termed AO2R, for "all optical regeneration and reshaping." This would free the network nodes from the limitations placed on signal processing by the electrical domain processing circuitry.

Future optical networking line systems will incorporate service signals at both 10 Gb/s as well as 40 Gb/s along with their associated Forward Error Corrected (FEC) overhead. Beyond that 80 Gb/s is just around the corner. The FEC rates related to, for example, 10 Gb/s data transport include the 64/63 coding for 10 Gb/s Ethernet, the 15/14 encoding of SONET-OC192 FEC and the strong-FEC rate of 12.25 Gb/s, as well as numerous potential coding schemes yet to be developed. Effectively, to support multiple FEC—and other coding related—protocols, an optical network node must be able to process numerous line rates.

In general, it is a useful function to be able to switch a signal that came in on one wavelength to output on another. This may arise when an input signal arriving from a client on one service wavelength is provisioned outbound on another. In conventional OEO 2R systems, it is a simple matter to switch an incoming signal to a different wavelength inasmuch as once the signal has been converted to the electrical domain, it is feasible to reconvert it to the optical domain on a different wavelength than the one it arrived on by using the electrical signal to drive a laser at a new different wavelength. The problem arises in achieving this functionality in an AO2R system, where the signal remains in the optical domain at its original wavelength.

What is needed therefore, is an AO2R system, that is truly all-optical, that is transparent to both bit rate and protocol or format, and that supports any wavelength in the carrier frequency range (wavelength range) of the modern telecommunications systems, the C and L wavelength bands, and that can convert an incoming signal to a different wavelength when it is output.

SUMMARY OF THE INVENTION

A system, method and device for AO2R is presented. The AO2R system presented is redundant, containing multiple pathways for the input and output signals to travel. The system carries out both the regeneration and reshaping functions in the optical domain, and returns a clean output signal at the same bit rate and in the same format as the input signal, on a wavelength of choice. As an all optical device, the apparatus is bit rate and format transparent, and requires no optical-electrical-optical conversion. The system's built in redundancy and symmetry allows less than perfect yields on components to be tolerated, thus increasing the utility of devices manufactured with less than perfect yields. In alternative embodiments the redundancy aspect of the invention can be extended to any optical signal processing device, thus facilitating high availability optical signal processing.

DETAILED DESCRIPTION OF THE PREFERRED EMBODIMENTS

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and subprocesses). The invention is capable of other embodiments and of being practiced or being carried out in various ways. Also, it is to be understood that the phraseology and terminology used herein is for the purpose of description and should not be regarded as in any way limiting.

In modern all optical data networks, a high availability optical signal processor is required to improve the reliability of a transmitted data signal. Such a high availability signal processor would accomplish reshaping and regeneration of the incoming noisy or "dirty" input signal, whose originally clean square pulse waveforms have lost amplitude, have spread out beyond their original pulse widths, and have had noise waveforms introduced as well over their long trip through the DWDM long haul leg of the network.

Figure 1:
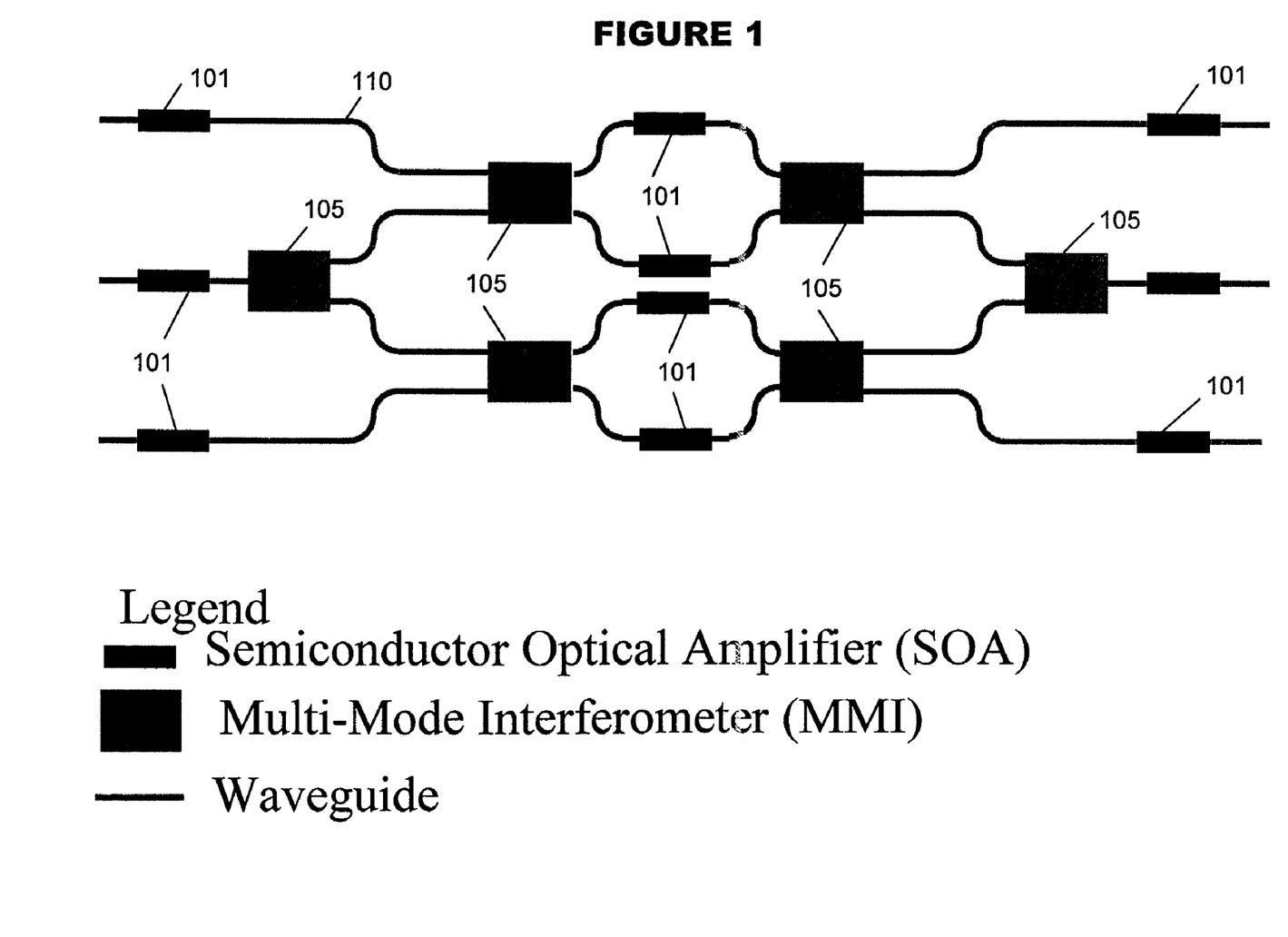
FIG. 1 depicts a 3×3 redundant AO2R/wavelength conversion module according to the present invention.

The basic components of a module to perform all optical reshaping and regeneration are depicted in FIG. 1 and will be described with reference thereto. FIG. 1 shows a redundant all optical AO2R/wavelength conversion module, as shall be described below. The basic components of this module are semiconductor optical amplifiers ("SOAs") 101 represented by the short wide rectangles, multimode interferometers ("MMIs") 105 represented by the tall wide rectangles and optical waveguides 110 represented as straight or curved lines.

For commercial applications, an AO2R module, to be viable, must not work only some of the time; it must work all of the time. Moreover, in light of the structures depicted in FIGS. 1 and 2, it can be seen that there are numerous components to the AO2R module. When the AO2R module is fabricated on an integrated optical circuit, under current manufacturing processes not all of the SOAs are generally viable. In fact, only a certain proportion of SOAs fabricated in any given fabrication run are operable to required specifications. Such proportion can be expressed as a yield Y which is a number between zero and unity. If each SOA was mission critical, or put another way, there was no redundancy, one failed SOA could render the entire module unusable, wasting both energy, physical and monetary resources, and time.

The present invention obviates many yield related concerns by exploiting a built in redundancy. Such redundancy exploitation will next be described with reference to FIGS. 2–7.

Figure 2:
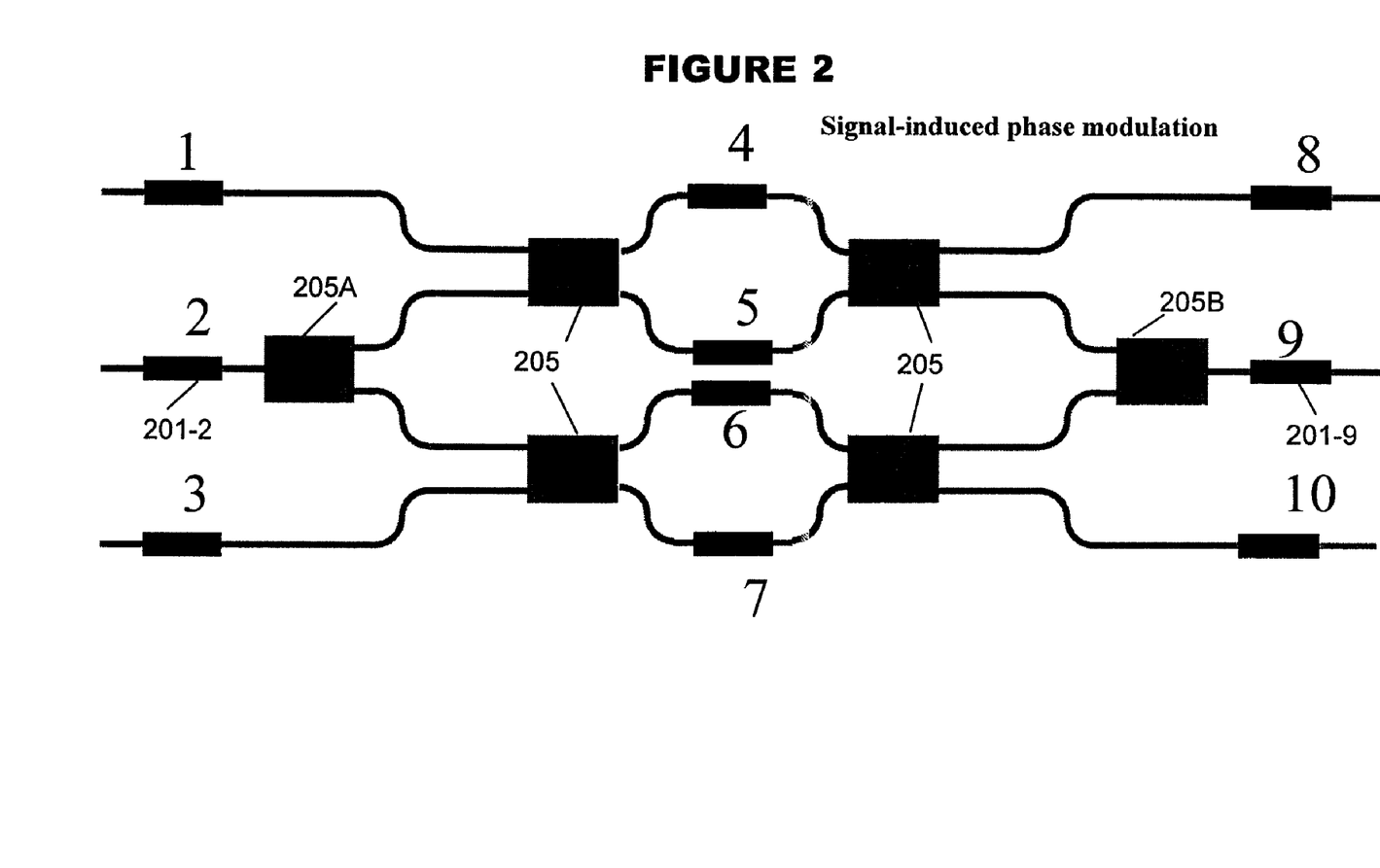
FIG. 2 shows the module of FIG. 1 with the semiconductor optical amplifiers numbered.

FIG. 2 depicts an exemplary AO2R module in accordance with the preferred embodiment of the present invention. What is shown is a 3×3 integrated optical device using six multimode interferometers 205 and ten SOAs 210. As will be shown with reference to FIGS. 3 and 4, the module of FIG. 2 in actuality contains two disjoint AO2R modules, each of which can perform the AO2R functionality. Moreover, what should be noted is that the multimode interferometer located adjacent to SOAs 2 201-2 and 9 201-9 in FIG. 2 is depicted as having only one input port. In actuality, like all 2×2 multimode interferometers it has two input ports. This implies that instead of SOAs 2 201-2 and 9 201-9 only being capable of inputting, or outputting, as the case may be, optical signals to and from the interferometers 205A and 205B, there is also an unshown additional I/O port to each of these central line interferometers 205A and 205B which can be used to input/output optical signals. The device could thus be built with additional SOAs attached to each of these input IO waveguides increasing further the redundancy of the device, as shall be described below.

Figure 3:
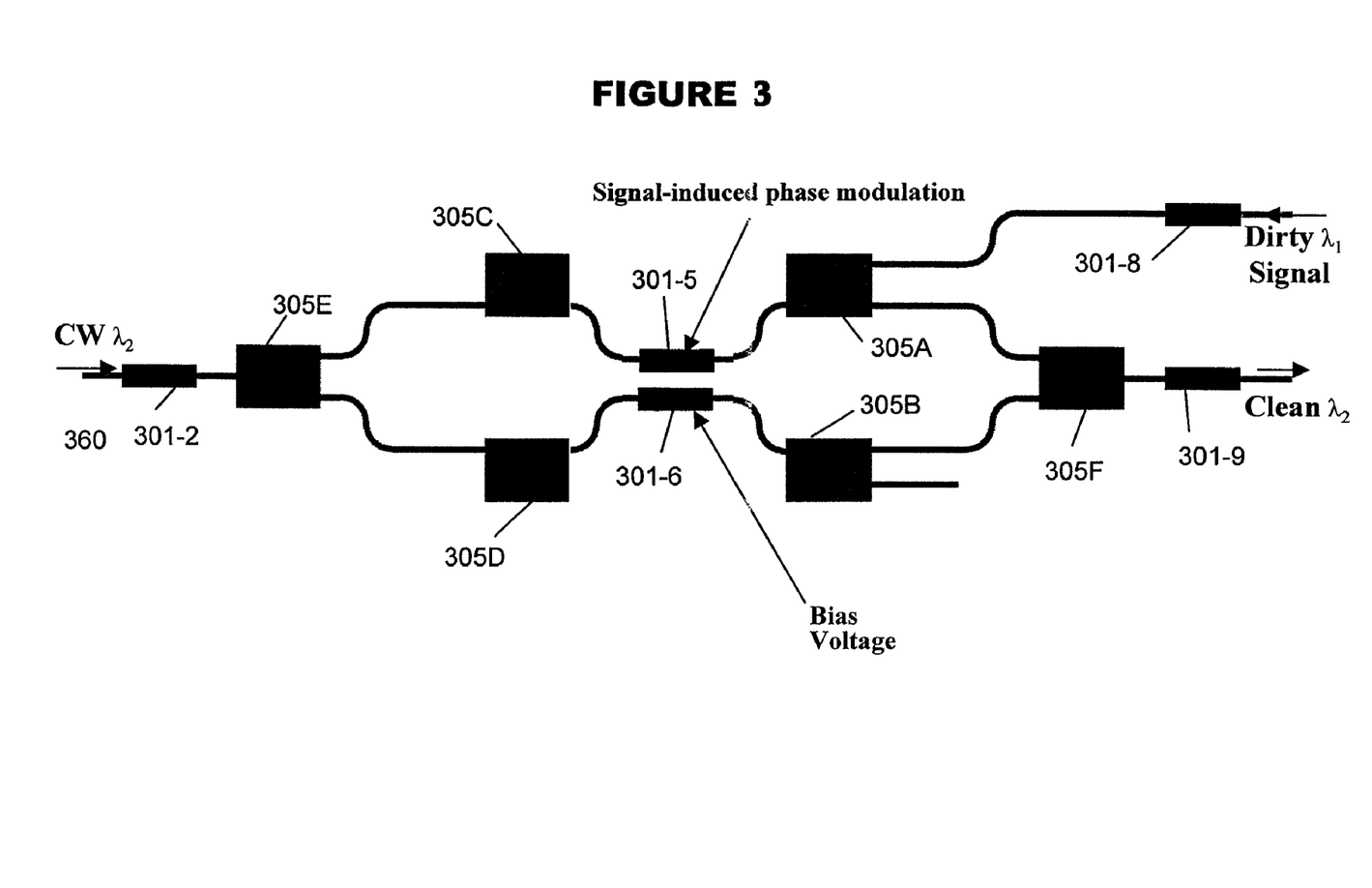
FIG. 3 extracts the necessary components for a non-redundant module from the module depicted in FIG. 2.

The basic operation of the device will now be described with reference to FIGS. 3 and 4. With reference to FIG. 3, an incoming "dirty" signal 350 on wavelength lambda 1 is input to the device at the upper right of the figure. It passes through amplifying SOA 301-8 through multimode interferometer 305A and to SOA 301-5. SOA 301-5 does not act as an amplifying semiconductor optical amplifier but rather as an SOA in saturation mode whose function is to induce phase modulation upon receipt of an incoming signal. Thus, the functionality of the module depicted in FIG. 3 is as follows: a continuous wavelength ("CW") light source at wavelength lambda 2 is inputted through the device through SOA 301-1. SOA 301-1, an amplifying SOA, and the signal is then propagated through MMI 305E and MMIs 305C and 305D. Next, through SOAs 301-5 and 301-6, through MMIs 305A and 305B where the signals recombine and MMI 305F one part of which, taking half the signal from the 3DB coupler, is outputted through amplifying SOA 301-9 as the clean signal, having the same wavelength as the continuous wavelength input, or lambda 2. The SOA 301-6 is subjected to a bias voltage from an external voltage source such that there is a phase difference of 180 degrees between SOAs 301-5 and 301-6. Thus, in the absence of an input signal 350 the continuous wavelength light signal 360 will combine destructively due to the phase shift between SOAs 301-5 and 301-6 and there will not be output any clean signal 360.

However, if an incoming "dirty" signal 350 is received and propagated through SOA 301-8, and further propagated through MMI 305A so as to be absorbed by SOA 301-5, SOA 301-5 undergoes the corresponding 180 degree phase modulation due to the incoming signal and at this point SOAs 301-5 and 301-6 are once again in phase; thus the CW light 360 constructively interferes and comes out as clean signal 370. For this reason, SOA 301-5 is labeled as "signal induced phase modulation" as opposed to phase modulation due to a bias voltage as in the case of SOA 301-6. Thus, the existence of a pulse on the dirty signal 350 will cause constructive interference in MMI 305F of a clean CW 360 signal resulting in a clean pulse output 370. If there is no pulse on the dirty input signal line, then the CW light is destructively interfered and no pulse appears on the output 370. In this fashion, the dirty input signal 350, assumably coming from a long journey, inputs to the AO2R module to modulate the clean signal.

When the clean signal, i.e., CW 360, is on a different wavelength lambda 2, this results in wavelength conversion as well. Of course, lambda 2 could be set equal to lambda 1 in which case wavelength conversion would not occur.

In alternative embodiments the use of wavelength conversion or not will depend on network conditions, and the possible preference of one wavelength over another at a certain network node.

As can be seen from FIG. 3, the clean signal propagates from left to right and the dirty signal propagates from right to left ultimately be absorbed at SOA 301-5 and induce phase modulation.

Referring again to FIG. 2, it can be seen that a nearly disjoint structure exists accomplishing the same functionality. With reference to FIG. 2, instead of utilizing central SOAs 5 and 6 as is done in FIG. 3, SOAs 4 and 7 could be utilized to achieve the same results. Thus, if something was wrong with either SOAs 5 or 6, the alternative configuration of FIG. 4 could be utilized. With reference to FIG. 4, that configuration uses one of SOAs 2 and 5 as the SOA with the externally applied bias voltage and the other one is utilized as being in line with the dirty signal input 450. The dirty signal input at lambda 1 450 thus modulates the clean CW 460 signal at lambda 2 and causes it to constructively interfere when there is an input pulse on the dirty signal 450 input such that a clean pulse is outputted at lambda 2 at the ooutput of the device 470. It is noted that the input and output directions of FIG. 4 are reversed relative to those of FIG. 3; this is arbitrary and just as easily the configuration of FIG. 4 could be rotated 180 degrees about a line running vertically between SOAs 2 and 5 such that the clean output signal would output to the right of the figure and the continuous wavelength input signal would be input at the left of the figure, with the dirty signal 450 being input at the right of the figure as well. What is necessary in the AO3R configuration of FIGS. 3 and 4 is simply that the continuous wavelength input enters at one side of the device and the clean output enters on the opposite side, and that the dirty signal input enters from the same side from which the clean signal output exits. Finally, the dirty signal must propagate through a central SOA which does not have a bias voltage (so that it can modulate the phase via signal induced phase modulation).

For maximum redundancy, the way to construct the device of FIG. 2 is to set each of SOAs 4, 5, 6 and 7 to receive an external electrical bias. If the SOA in question is ultimately desired to be used as an SOA with an external bias, then the bias will be applied thereat. If not, the bias port will be non-utilized and the SOA will be used for the purposes of signal induced phase modulation. In that way, there is flexibility as to which of SOAs 1, 3, 8 and 10 can be utilized to input the dirty signal. In every possible configuration of th edevice of FIG. 2, the SOAs 2 and 9 are critical. One of them must be used for a CW input, the other must be used for the clean output. As described above however, it is not necessary to rely on the simultaneous viability of both SOAs 2 and 9. An additional shadow SOA could be appended to the non-depicted and non-used I/O waveguide to each of MMIs 205A and 205B in FIG. 2 such that only one of SOA2 and its shadow and only one of SOA9 and its shadow need to be operable for the device to work. This would be the configuration of the device fabricated in a preferred embodiment.

Figure 4:
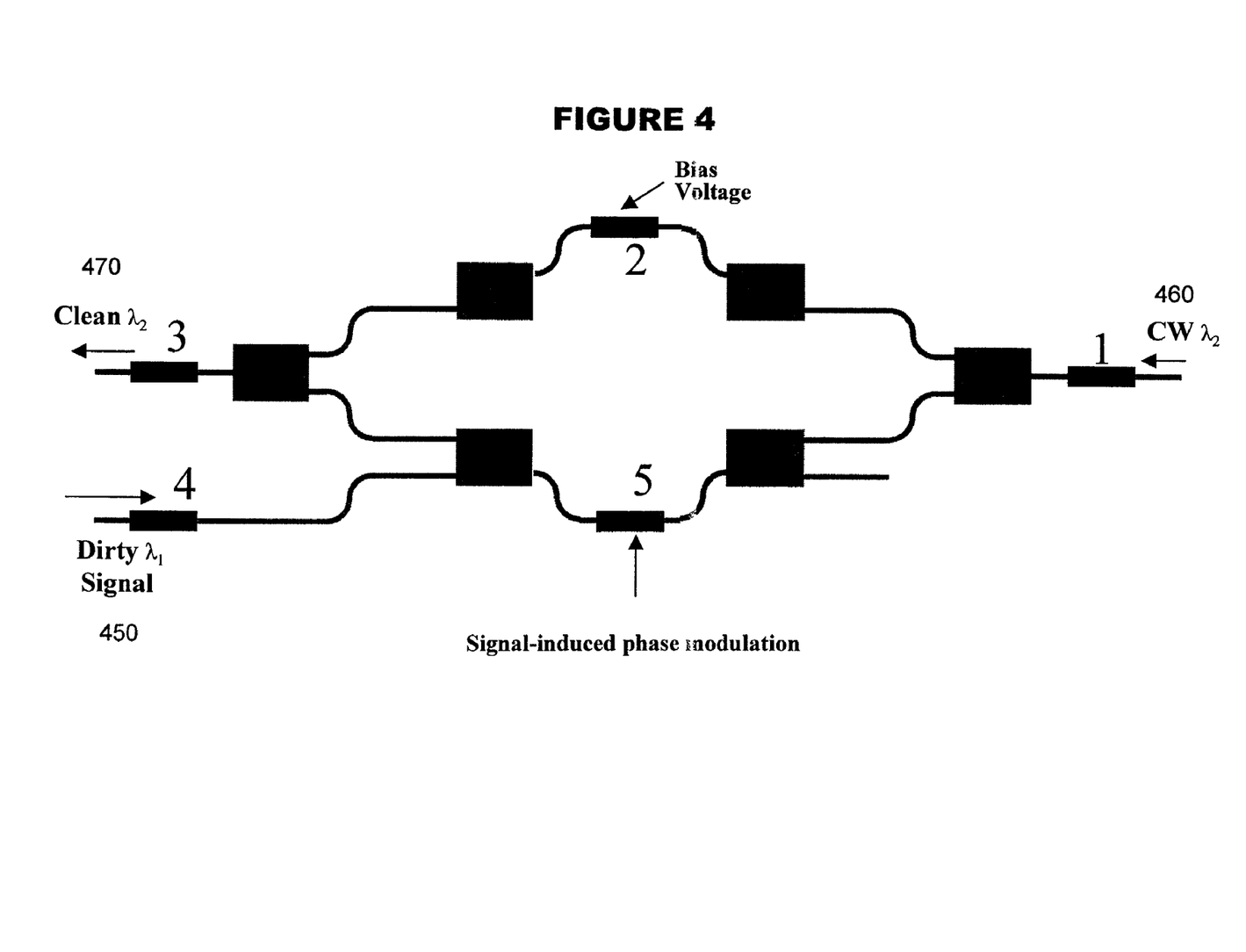
FIG. 4 extracts the components for an alternative non-redundant module from the module of FIG. 2.
Figure 5:
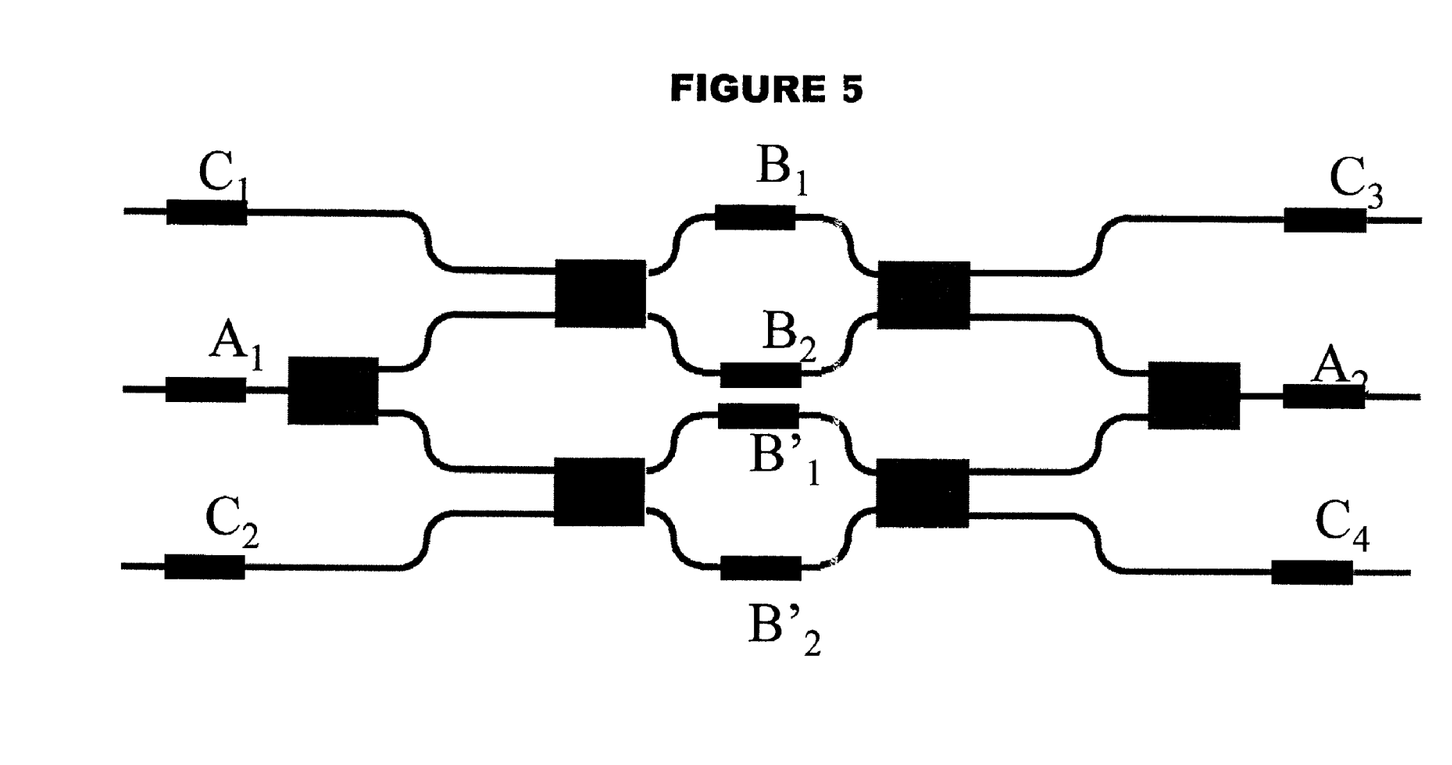
FIG. 5 depicts the module of FIGS. 1 and 2 with a different indexing system for the semiconductor optical amplifiers for ease of illustration.

Next, the devices of FIGS. 2, 3 and 4 will be once again presented in an alternative manner for ease of illustration. FIG. 5 depicts the device of FIG. 2 with the SOAs relabeled in terms of As, Bs and Cs. This wavelength scheme reflects the function of the various SOAs. SOAs labeled A are the inputs and outputs of the clean signal, in the general case at lambda 2, where lambda 2 is different than the input dirty signal wavelength lambda 1. SOAs labeled B are the central SOAs which are responsible for creating states of constructive or destructive interference for the CW input signal. It is noted that SOAs B do not function as amplifying SOAs, but rather as SOAs operating in the saturation region whose function is to implement signal induced phase modulation. SOAs labeled C are the potential inputs for the dirty signal, nominally at lambda 1. If, as described above, each of SOAs B has the capacity to take an external electrical bias, whether by voltage or current, then there is flexibility in the use of any of the SOAs labeled C as the input of the dirty signal.

Figure 6:
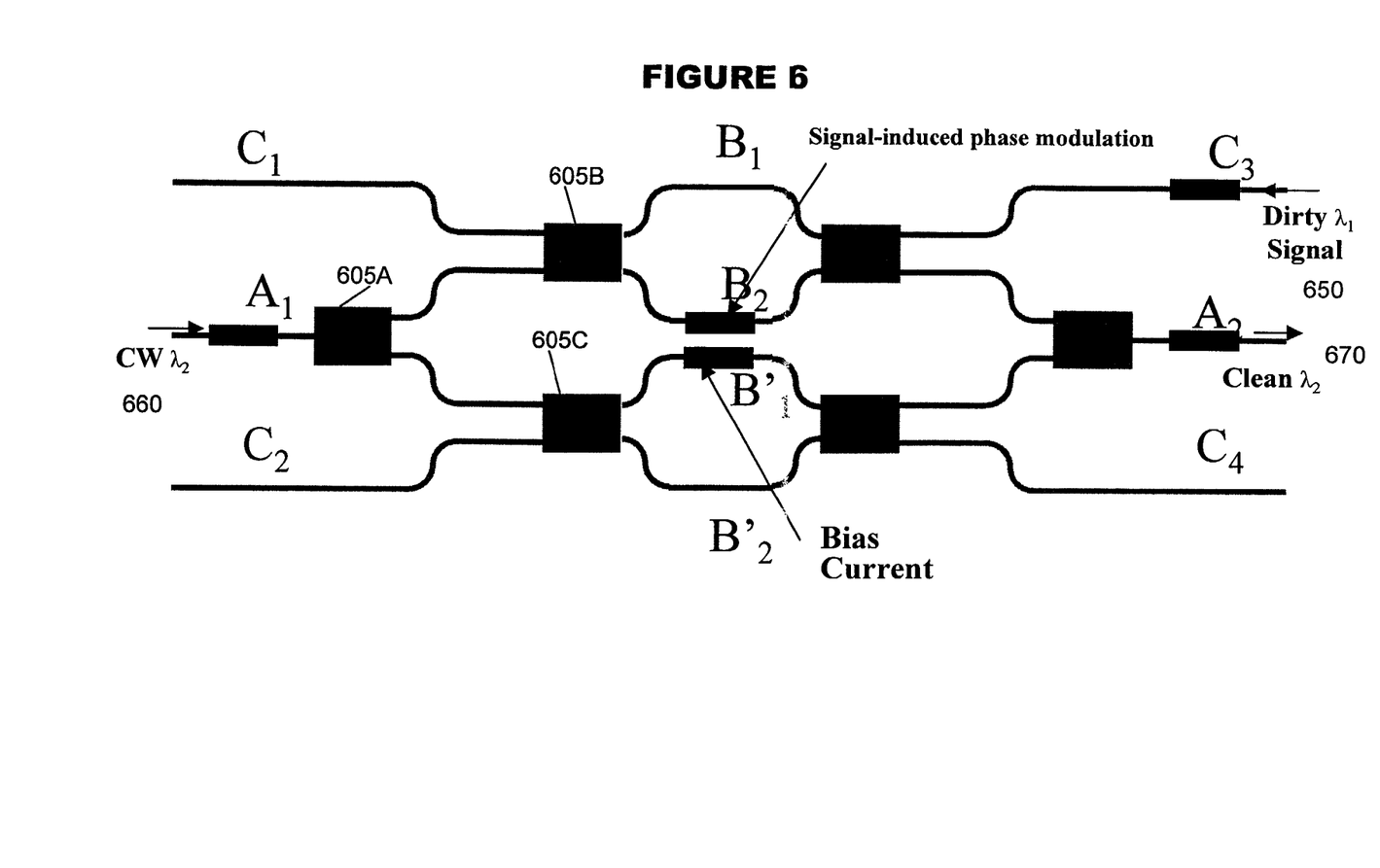
FIG. 6 depicts the module of FIG. 5 showing only the active semiconductor optical amplifiers for a configuration similar to that of FIG. 3.

With reference to FIG. 6, the configuration depicted in FIG. 3 will now be described. However, FIG. 6 not only shows the configuration of FIG. 3, but also shows the rest of the device as shown in FIGS. 2 and 5, so that the redundancy can be better appreciated. With reference to FIG. 6, the CW input lambda 2 660 is input from the left of the figure through SOA A1. From there it is fed into MMI 605A and from there to each of MMIs 605B and 605C. The signal output from one port of MMI 605B is taken through SOA B2 which is the SOA which will implement the signal induced phase modulation. Accordingly, dirty signal 650 needs to be input from the top right of the figure. The reason that it must be input from the top right of the figure is as follows. Once the B-type SOA to implement signal induced phase modulation is chosen, the only possible port into which the dirty signal 650 can be input, is one through which the dirty signal 650 can cross propagate relative to the CW input signal 660. Thus, it must provide a path through the chosen B-type SOA, which originates on the opposite side of the device as does the CW input. It is noted from FIG. 6, as well as the other figures presented, that the CW input signal is split by MMI 605A into a upper and a lower signal. One of these two pathways must be the pathway where signal phase induced modulation is implemented and the other pathways must be the one where an external bias current or bias voltage is applied. This is the means by which constructive and destructive interference of the two "daughter" signals of CW signal 660 is effected. Therefore, the B-type SOAs are naturally divided into two distinct pairs. At least one SOA from each pair must be operable as a signal induced phase modulator and at least one SOA from the other pair of B-type SOAs must be operable under an external bias current or bias voltage.

In the exemplary embodiment of FIG. 6, the upper pair of B-type SOAs has been chosen to implement signal induced phase modulation. This determines that at least one of the lower pair of SOAs B1' and B2', must be operable to introduce phase modulation in response to an external bias current or bias voltage. Which pair is chosen for which is arbitrary. However, once one pair is chosen, the other pairs' function is determined. Similarly, once the pair implementing signal induced phase modulation is chosen, whether the top or whether the bottom of the device can serve as the input for the dirty signal is also determined. The dirty input signal 650 must be input on the same vertical side (i.e., top or bottom), as that which the signal induced phase modulator B-type SOA is located. In the exemplary embodiment of FIG. 6, since B2 is functioning as the signal induced phase modulator then amplifying SOA C3 is the only choice for the dirty signal input 650. In parallel fashion, instead of B2, the upper B-type SOA from the upper pair of B-type SOAs, namely B1, could equivalently function as the signal induced phase modulator.

SOAs which are operable, but not needed as amplifiers in the chosen signal path can be made to operate in the absorbing mode in order to absorb back-reflected signals and thus reduce the effect of stray reflections on the quality of the processed signal.

Figure 7:
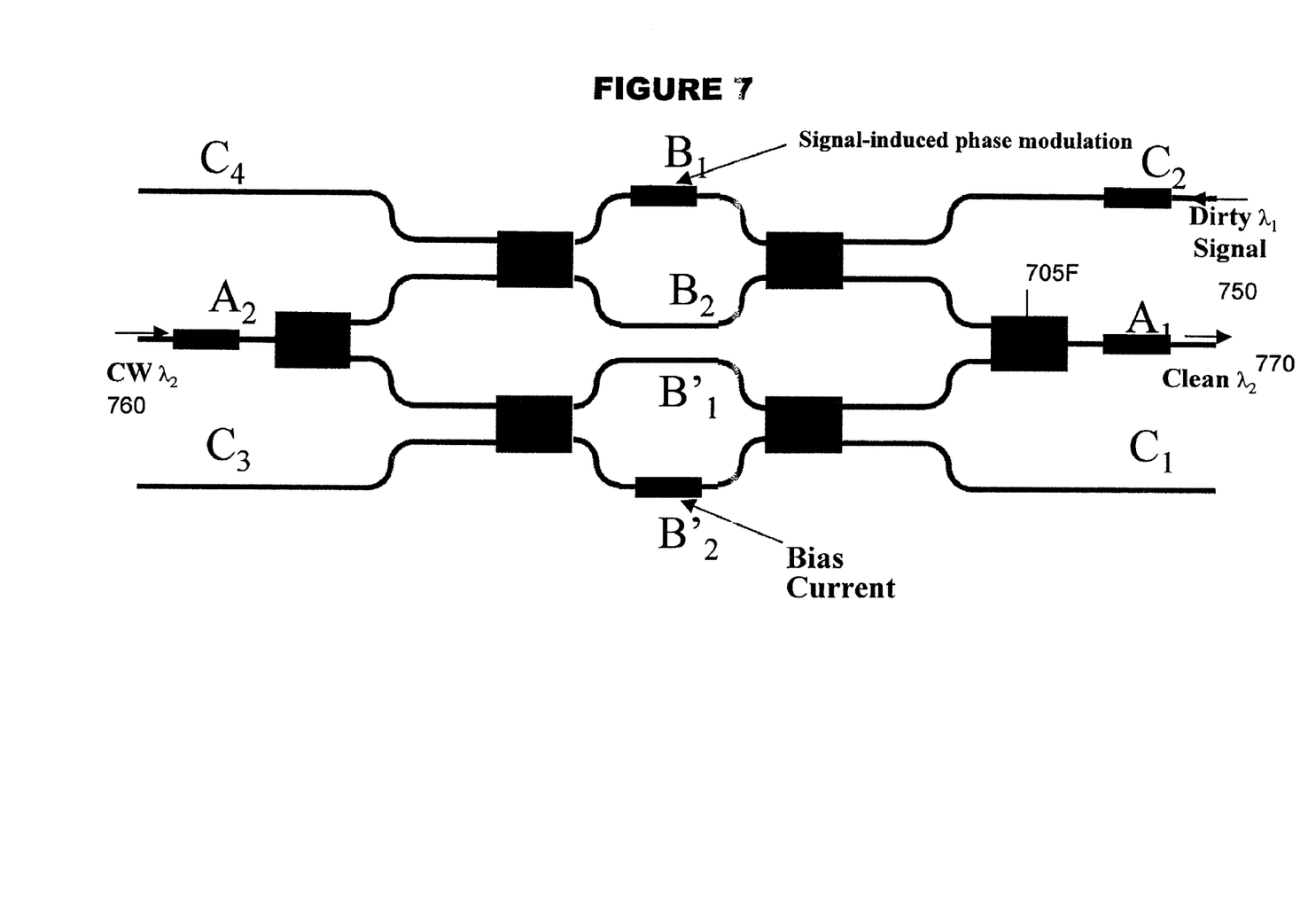
FIG. 7 depicts the module of FIG. 5 showing only the active semiconductor optical amplifiers for a configuration similar to that of FIG. 4.

Alternatively, had the signal induced phase modulator SOA been desired to be from the lower pair (i.e., B1', B2') of B-type SOAs, then at least one of the SOAs from the pair B1, B2 would have to function as inducing phase modulation in response to an external bias current or bias voltage and C4 would have to be the input for the dirty signal 650 so that it could cross propagate through the same SOA implementing the signal induced phase modulation. FIGS. 6 and 7 therefore depict two out of eight possible configurations which will implement the AO2R functionality of the device of FIGS. 2 and 5. It is noted that to exhaustively describe each of these eight possibilities would be too redundant even for an invention which deals with exploitation of redundancies. It is noted that one more example embodiment should suffice to convey the functionality common to all of the possible exemplary embodiments.

With reference to FIG. 7, that final example will now be described. FIG. 7 has numerous similarities to the exemplary embodiment of FIG. 6. In both, the left side of the device has been chosen as the input for the CW signal, in FIG. 7 labeled as 760. In both FIGS. 6 and 7, the lower pair of B-type SOAs, namely B2' and B1' are those SOAs which will function in response to an external bias current or bias voltage. Therefore, the upper pair of SOAs B2, B1 will provide the ultimate B-type SOA that accesses a signal induced phase modulator. In FIG. 7, while that SOA is B1 it could just as well be B2. Given the fact that signal induced phase modulation is occurring in the upper, or top portion of the figure in the exemplary embodiment of FIG. 7, utilizing SOA B1, the dirty signal 750 which is to be optically processed must enter from the right side of the figure through amplifying SOA C2. Finally, the clean signal on the same wavelength lambda 2 as the CW input 760 exits at one of the I/O ports to MMI 705F. In the exemplary embodiment of FIG. 7, it is shown exiting through amplifying SOA A1.

The following addresses mathematically the benefits of the redundancy of the present invention.

Let p equal the probability of successfully manufacturing an individual SOA. Referring to FIG. 5, both $A_1$ and $A_2$ must succeed for the device to be operable. The probability of this outcome is:

$$P_A = p^2.$$

In addition, at least 2 out of the four central SOA's (the B's) must succeed, one from the top (unprimed) and one from the bottom (primed). Explicitly, any of the following successful combinations will work: $(B_1, B'_1)$, $(B_1, B'_2)$, $(B_2, B'_1)$, $(B_2, B'_2)$. The probability of this outcome is:

$$P_B = p^4 + 4p^3(1-p) + 4p^2(1-p)^2.$$

Moreover, at least 1 out of the four corner SOA's (the C's) must succeed. The probability of this outcome is:

$$P_C = p^4 + 4p^3(1-p) + 6p^2(1-p)^2 + 4p(1-p)^3 = 1 - (1-p)^4.$$

The overall probability of the device shown in FIG. 5 (and similar figures) working is thus $$P = P_A P_B P_C.$$

If p=0.3, the overall probability of success for a non-redundant device is $p^5 = 0.00243$. If p=0.3, the overall probability of success for a redundant device is roughly P=0.0178, representing more than a sevenfold increase in yield.

FIG. 5 shows a configuration with all SOA's working. FIG. 6 shows a configuration with only 5 SOA's working. FIG. 7 shows another configuration with only 5 SOA's working.

Comparison of FIGS. 6 and 7 shows that they are related by a 180 degree rotation of the device. The external interfaces (laser, input, output) remain in the same position. Thus, the yield enhancement property does not destroy the modularity of the device.

It is noted that in an alternate embodiment of the device of FIGS. 5–7 (and similar figures), a tunable laser will be used as the CW input, allowing a spectrum of output wavelengths as opposed to one fixed output wavelength.

Figure 8:
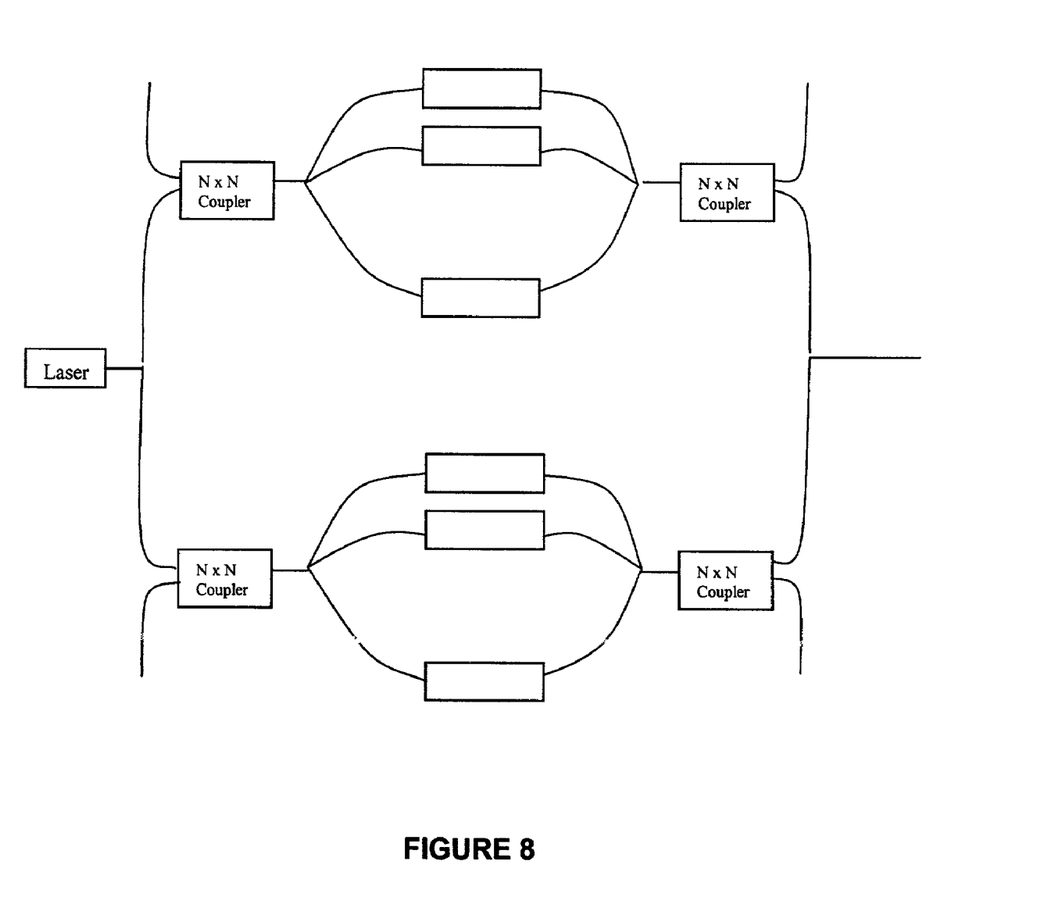
FIG. 8 depicts an exemplary N×N high availability optical signal processing scheme according to the present invention.

In a similar manner, the structure of the present invention can be expanded to an N×N device, where each MMI is N×N. Such expansion can be utilized to further increase redundancy, or to allow for high availability optical signal processing, providing numerous possible pathways. Such a general N×N device is depicted schematically in FIG. 8.

Figure 9:
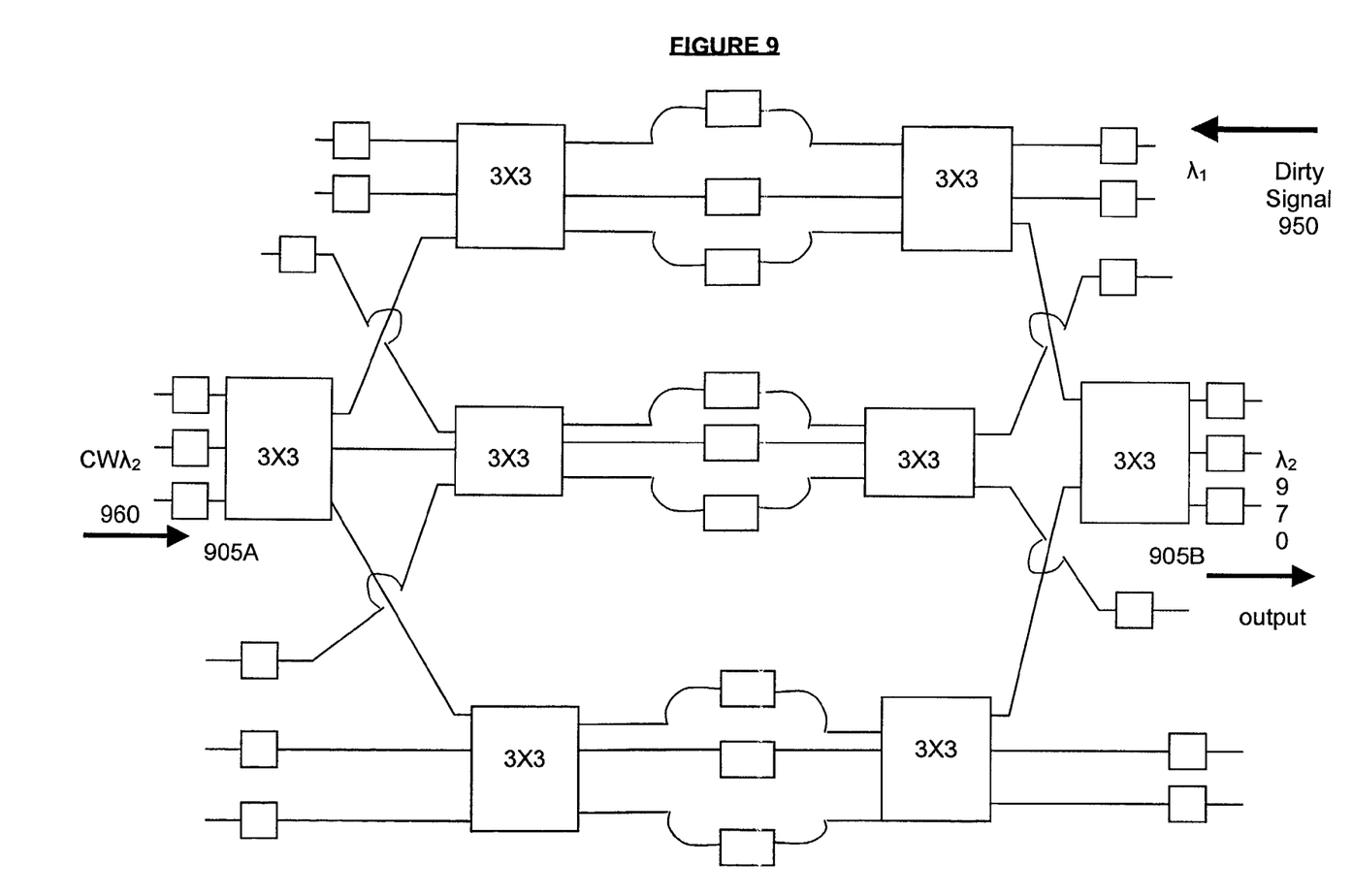
FIG. 9 extends the device of FIG. 5 to the case where N=3.

Specifically, FIG. 9 depicts the extension of the device of FIG. 5 for the case N=3. With reference to FIG. 9, SOAs are drawn as small rectangular boxes, and MMIs are drawn as larger approximately square boxes. As can be seen, there are 9 inputs and 9 outputs to the device. In the depicted configuration (there being numerous possible configurations in terms of where the CW and dirty inputs, and the clean output signals, could be connected) the CW input 960 could be at three possible inputs to MMI 905A, and the clean output at three possible connections to MMI 905B. As well the dirty signal input could utilize any of six possible inputs. There are nine central SOAs, and only two are needed for the constructive/destructive interference of the CW input (accomplished as above, with one SOA under a bias to shift its phase, and the other implementing signal induced phase shifts) which ultimately occurs in MMI 905B, allowing for numerous possible combinations.

Alternatively, the concept of the present invention can be expanded as well, not being restricted to an AO2R device as described herein. Any integrated optical device for optical signal processing can be constructed with varying quantities of redundancy so as to provide multiple pathways for incoming and outgoing optical signals, and thus facilitate high availability signal processing in photonic networks. Such devices offer $N^2$ information pathways (waveguide→SOA→waveguide) of equal length to transmit DWDM or other optical data signals. In this manner, transmitted data signals at the output of each of the multimode interference couplers ("MMIC"s) have the choice of N pathways to travel. In event of a failure in a single pathway, N−1 pathways would still be available for data transmission. Thus, in general, such circuits improve the yield, i.e. probability of successful transmission of the data signal, by a factor of $N^2$, using an N×N MMIC and $N^2$ information pathways of equal length. The device described above is this general N×N solution specific to a 2×2 AO2R/Wavelength Converter circuit.

It is noted that the above discussion describes the benefit of redundancy which insures a higher yield of device. As well, in fabrication technologies where the probability of failure of an SOA or other component is low, and thus nearly all SOAs would be functional, the method and device of the present invention can be utilized in applications which require multiple copies of an output signal for use in further processing, or utilize the extra SOAs for alternative uses such as monitoring, photodetection, or the like.

In another alternative embodiment, although the preferred embodiment of the present invention contemplates use in an all-optical communications or data system, it could alternatively be utilized as a retrofit for an OEO system. As the data rate of optical transmission system increases, receivers with high bandwidth are required. However, sensitivity of a receiver for the same Bit Error Rate (BER) decreases as the data rate increases. For example, the sensitivity of a typical PIN detector at 10 Gbps is −16 dBm, while the sensitivity of the same detector at 40 Gbps would be approximately −10 dBm. This sensitivity is not practical for a typical optical transmission system.

Thus, using the device and method of the present invention, a high performance receiver package could be constructed that consists of two stages; the first stage for signal quality improvement and the second stage for optical to electrical conversion. The input signal quality improvement in the first stage is achieved using the all optical signal processor (AOSP) described above. The AOSP improves OSNR of the input signal by regenerating the signal before optical to electrical conversion in the second stage. As an example, the first stage could be the device of FIG. 7. Essentially the clean output from the AOSP, i.e., the output 770 in FIG. 7, would then be subjected to OEO conversion in the second stage. Such uses would for example be beneficial in systems which perform retiming via OEO conversion.

While the above describes the preferred embodiments of the invention, various modifications or additions will be apparent to those of skill in the art. Such modifications and additions are intended to be covered by the following claims.

What is claimed:

1. A multipath all optical regenerator and reshaper, comprising:
   N semiconductor optical amplifiers ("SOA"s);
   M multimode interferometers ("MMI"s);
   a plurality of waveguides interconnecting the SOAs and MMIs;
   a plurality of possible inputs for a dirty optical signal at a first wavelength;
   a plurality of possible inputs for a continuous wavelength signal at a second wavelength; and
   a plurality of possible outputs for a clean signal at the second wavelength;
   two of said SOAs in different signal paths being disposed for inductive interaction, a first thereof being operated in a saturation mode so as to induce phase modulation upon receiving a signal, a second thereof being operated as an amplifier which is biased to have a 180° phase shift relative to the first SOA, so that signals passing through said two SOAs in a forward direction interfere destructively, the first SOA being connected to receive a reverse direction signal which causes it to have a 180° phase shift, whereby signals traveling through the first and second SOAs are brought into phase and interfere constructively;
   wherein the regenerator and reshaper comprise at least two disjoint configurations, each of which can implement the regeneration and reshaping functionality notwithstanding the failure of one or more SOAs, MMIs or waveguides in the other configurations.

2. The device of claim 1, wherein the first wavelength and the second wavelength can be the same.

3. The device of claim 1, wherein the continuous wavelength input is a tunable laser, and the second wavelength is adjustable.

4. A multipath all optical regenerator and reshaper, comprising:
   N semiconductor optical amplifiers ("SOA"s);
   M multimode interferometers ("MMI"s);
   a plurality of waveguides interconnecting the SOAs and MMIs;
   a plurality of possible inputs for a dirty optical signal at a first wavelength;
   a plurality of possible inputs for a continuous wavelength signal at a second wavelength; and
   a plurality of possible outputs for a clean signal at the second wavelength;
   wherein the regenerator and reshaper comprise at least two disjoint configurations, each of which can implement the regeneration and reshaping functionality notwithstanding the failure of one or more SOAs, MMIs or waveguides in the other configurations;
   where N equals 10, M equals 6, and the device comprises at least two disjoint configurations.

5. The device of claim 1, wherein the device is integrated on a common substrate.

6. The device of claim 5, where numerous devices are fabricated on a common wafer, and then separated into individual chips after such fabrication.

7. The device of claim 6, where the probability of each SOA being operational after fabrication is less than 1.

8. The device of claim 7, where said probability is significantly less than 1.

9. A method of increasing the probability that a given integrated optical signal processor will be functional, comprising:
   providing multiple redundant paths for input and output optical signals in the optical signal processor,
   such that failure of one or more components in one redundant path does not render the optical signal processor nonfunctional overall.

10. The method of claim 9, where the optical signal processor is an AO2R device.

11. The method of claim 9, where the optical signal processor is a wavelength converter.

12. A multipath all optical regenerator and reshaper, comprising:
   N semiconductor optical amplifiers ("SOA"s);
   M multimode interferometers ("MMI"s);
   a plurality of waveguides interconnecting the SOAs and MMIs;
   a plurality of possible inputs for a dirty optical signal at a first wavelength;
   a plurality of possible inputs for a continuous wavelength signal at a second wavelength; and
   a plurality of possible outputs for a clean signal at the second wavelength;
   wherein the regenerator and reshaper comprise at least two disjoint configurations, each of which can implement the regeneration and reshaping functionality notwithstanding the failure of one or more SOAs, MMIs or waveguides in the other configurations:
   wherein the first wavelength and the second wavelength can be the same;
   where N equals 10, M equals 6, and the device comprises at least two disjoint configurations.

* * * * *